United States Patent
Yamamoto et al.

(10) Patent No.: US 8,524,509 B2
(45) Date of Patent: Sep. 3, 2013

(54) METHOD FOR FORMING POLARIZATION REVERSAL

(75) Inventors: Futoshi Yamamoto, Tokyo (JP); Junichiro Ichikawa, Tokyo (JP); Satoshi Oikawa, Tokyo (JP); Sunao Kurimura, Ibaraki (JP); Kenji Kitamura, Ibaraki (JP)

(73) Assignees: Sumitomo Osaka Cement Co., Ltd., Chiyoda-ku, Tokyo (JP); National Institute for Materials Science, Ibaraki (JP)

( * ) Notice: Subject to any disclaimer, the term of this patent is extended or adjusted under 35 U.S.C. 154(b) by 0 days.

(21) Appl. No.: 13/066,730

(22) Filed: Apr. 22, 2011

(65) Prior Publication Data
US 2011/0201133 A1 Aug. 18, 2011

Related U.S. Application Data

(62) Division of application No. 11/083,735, filed on Mar. 18, 2005.

(30) Foreign Application Priority Data

Mar. 18, 2004 (JP) .................. 2004-079224
Mar. 25, 2004 (JP) .................. 2004-089890
Mar. 31, 2004 (JP) .................. 2004-104323

(51) Int. Cl.
*H01L 21/00* (2006.01)

(52) U.S. Cl.
USPC .............................................. 438/3; 257/295

(58) Field of Classification Search
USPC .............. 438/3; 257/295; 359/326–332
See application file for complete search history.

(56) References Cited

U.S. PATENT DOCUMENTS

5,519,802 A 5/1996 Field et al.
5,615,041 A 3/1997 Field et al.

FOREIGN PATENT DOCUMENTS

| JP | 4-273224 A | 9/1992 |
| JP | 5-307784 A | 11/1993 |
| JP | 8-304862 A | 11/1996 |
| JP | 8-313749 A | 11/1996 |
| JP | 9-017801 A | 1/1997 |
| JP | 10-039801 A | 2/1998 |

(Continued)

OTHER PUBLICATIONS

Machine Translation of JP11-002848A.*

(Continued)

*Primary Examiner* — Shaun Campbell
(74) *Attorney, Agent, or Firm* — Chapman and Cutler LLP

(57) ABSTRACT

A method for forming a ferroelectric spontaneous polarization reversal, including the steps of forming a concave portion on a top face of a ferroelectric substrate or a bottom face of a ferroelectric substrate, and applying an electric field into the substrate, wherein a ferroelectric spontaneous polarization reversal is formed at least in one portion of a region of the substrate with the concave portion, and wherein the shape of the concave portion is configured such that the width of the concave portion gets narrower gradually toward the inside of the substrate. The method may further include the steps of, after the reversal, making into almost a flat-plane the top or bottom face having the concave portion, and then, forming a new concave portion in another region and applying an electric field to form another reversal in one portion of the region of the substrate having the new concave portion.

6 Claims, 12 Drawing Sheets

(56) References Cited

FOREIGN PATENT DOCUMENTS

| | | |
|---|---|---|
| JP | 10-503602 A | 3/1998 |
| JP | 11-002848 A | 1/1999 |
| JP | 2000-147584 | 5/2000 |
| JP | 2001-235714 A | 8/2001 |
| JP | 2003-202530 | 7/2003 |
| JP | 2003-207811 A | 7/2003 |
| JP | 2003-330053 A | 11/2003 |
| JP | 2004-170711 | 6/2004 |

OTHER PUBLICATIONS

Kurima S., et al., Selective Nucleation Control for a Periodically Poled Lithium Niobate I—Motivation and Background, Lecture Handbook of the 49th Applied Physics Related Joint Lecture Meeting, Mar. 2002.

Akutsu, T., et al., Selective Nucleation Control for a Periodically Poled Lithium Niobate II—Periodical Poling by Selective Nucleation Control, Lecture Handbook of the 49th Applied Physics Related Joint Lecture Meeting, Mar. 2002.

Maruyama, M., et al., Selective Nucleation Control for a Periodically Poled Lithium Niobate III—Quantification of Nucleation Density by Particle Analysis, Lecture Handbook of the 49th Applied Physics Related Joint Lecture Meeting, Mar. 2002.

Nomura, Y., et al., Selective Nucleation Control for a Periodically Poled Lithium Niobate IV—Pulse Number Dependence of Nucleation Density, Lecture Handbook of the Japan Society of Applied Physics, the 63rd Meeting, Sep. 2002.

Maruyama, M., et al., Selective Nucleation Control for a Periodically Poled Lithium Niobate V—Nucleation Parameters for Short Period Structure, Lecture Handbook of the Japan Society of Applied Physics, the 63rd Meeting, Sep. 2002.

Maruyama, M., et al., Selective Nucleation Control for a Periodically Poled Lithium Niobate VII—Green Light SHG with High-Aspect-Ratio Periodic Domains, Lecture Handbook of the 50th Applied Physics Related Joint Lecture Meeting, Mar. 2003.

Oikawa, S., et al., Zero-Chirped Broadband-Type Z-Cut LiNbO3 Optical Modulator by Using Domain-Inversion Structure, Lecture Handbook of the Japan Society of Applied Physics, the 64th Autumn Meeting, 2003.

Ichikawa, J., et al., Zero-Chirped Broadband LiNbO3 Optical Modulator Using Polarization Reversal and Branch Electrode, Lecture Handbook of the 51st Applied Physics Related Joint Lecture Meeting, Mar. 2004.

Yamamoto, F., et al., Novel Polarization-Reversal Technique Using LiNbO3 Substrates with Patterned Grooves, Lecture Handbook of the 51st Applied Physics Related Joint Lecture Meeting, Mar. 2004.

Yamamoto, F., et al., Novel Polarization Reversal Technique Using Liquid Electrodes and LiNbO3 Substrates with Patterned Grooves, Conference on Lasers & Electro-Optics, 2004.

\* cited by examiner

METHOD FOR FORMING POLARIZATION REVERSAL

This application is a divisional of patent application Ser. No. 11/083,735 filed Mar. 18, 2005, claiming priority of Japan Pat. App. No. 2004-079224 filed Mar. 18, 2004; Japan Pat. App. No. 2004-089890 filed Mar. 25, 2004; and Japan Pat. App. No. 2004-104323 filed Mar. 31, 2004, and contents of all of these applications are hereby incorporated by reference.

BACKGROUND OF THE INVENTION (1) Field of the Invention

The present invention relates to a method for forming a ferroelectric spontaneous polarization reversal in a desired region of a ferroelectric substrate, and more particularly to a method for forming a ferroelectric spontaneous polarization reversal that forms on a substrate having an electrooptic effect that is used for an optical element. In addition, it relates to a method for forming a ferroelectric spontaneous polarization reversal, where a ferroelectric substrate has convexo-concave structure on its surface and at a region including one portion of said convex part. Further, it relates to a method for forming a ferroelectric spontaneous polarization reversal capable of reversing the polarity of a narrow region of a substrate and also, capable of narrowing the interval between ferroelectric spontaneous polarization reversal regions.

(2) Related Art Statement

An optical element such as a wavelength conversion element or an optical modulator is used in optical communication and optical measurement systems.

For example, a wavelength conversion element has periodical ferroelectric spontaneous polarization reversal structures on a substrate with an electrooptic effect such as a ferroelectric $LiNbO_3$, as disclosed in the following patent document 1.

Also, as an example of an optical modulator, the optical modulator which has optical waveguides on a substrate with an electrooptic effect and has a ferroelectric spontaneous polarization reversal structure in one portion of the substrate related to said optical waveguides to suppress chirp generation or to improve extinction ratio of modulation intensity, as disclosed in the following patent document 2, has been proposed.

[Patent Document 1] Japanese Patent Application Publication No. 2000-147584

[Patent Document 2] Japanese Patent Application Publication No. 2003-202530

As a method for forming a ferroelectric spontaneous polarization reversal region on a ferroelectric substrate, Ti thermal diffusion technique, heat treatment after loading $SiO_2$ technique, and a proton exchange and following heat treatment technique can be cited. In addition, a method for forming a ferroelectric spontaneous polarization reversal region by applying an electric field higher than the value of coercive filed (e.g. 20 kV/mm for $LiNbO_3$) is also known.

Specifically, ferroelectric spontaneous polarization reversal by applying an electric field is widely used as a method for forming a ferroelectric spontaneous polarization reversal because it is possible to form a ferroelectric spontaneous polarization reversal region accurately and the method for forming is simple.

As a method for forming a ferroelectric spontaneous polarization reversal by electric field, it has been proposed to apply a voltage 4 through electrodes 2 and 3 which are fabricated on the top and bottom faces of substrate 1 as shown FIG. 1, or to apply voltage 4 through electrodes 6 and 7 where conductive liquid is filled between substrate 1 and each electrode after fabricating insulating patterned mask 5 on the top face of substrate 1 using sealing members 8 and 9 at the same time as fixing said substrate as shown in FIG. 2. In addition, in case of using an insulating material such as an acrylic board instead of electrodes 6 and 7, it is arranged that an electric wire directly contact the conductive liquid for feeding of voltage 4.

By these methods, the ferroelectric spontaneous polarization reversal regions corresponding to the pattern of electrodes 2 and ferroelectric spontaneous polarization reversal regions corresponding to the region where the mask patterns 5 are not formed are formed respectively in FIG. 1 and FIG. 2.

For the methods for forming a ferroelectric spontaneous polarization reversal by electric field as stated above, when the width of a ferroelectric spontaneous polarization reversal region, for example a width L of a ferroelectric spontaneous polarization reversal region 10 formed on substrate 1 in FIG. 3 is less than 20 μm, it is possible to form relatively homogeneous ferroelectric spontaneous polarization reversal regions because a homogeneous voltage is applied all over the region where a ferroelectric spontaneous polarization reversal is to be formed.

On the other hand, when a large ferroelectric spontaneous polarization reversal region having width L of more than 50 μm is formed, it results in inhomogeneous ferroelectric spontaneous polarization reversal condition as a whole because a ferroelectric spontaneous polarization reversal is formed preferentially in the periphery of the region where a ferroelectric spontaneous polarization reversal is expected to be formed. Also, it becomes difficult to form a ferroelectric spontaneous polarization reversal homogeneously because of in-plane variation of wafer thickness and differences in voltage effects that are caused by dispersion of electric resistance of electrodes that apply an electric field. Thus, when a large diameter wafer is used, the differences of ferroelectric spontaneous polarization reversal condition depending on in-plane location of the wafer become prominent.

In the meantime, the following non patent documents 1 to 6 disclose that a process for forming a ferroelectric spontaneous polarization reversal comprises of the nucleation at the concentrated region of an electric field of an electrode edge, the expanding of microdomain in a depth direction so as not to increase electrostatic energy, the movement of domain wall in a transverse direction, and the stabilization of a ferroelectric spontaneous polarization reversal region, and these documents also disclose that the degree of nucleation density is important for homogeneity of a ferroelectric spontaneous polarization reversal.

In other words, it can be easily understood that, when a large region having width L of more than 50 μm for forming a ferroelectric spontaneous polarization reversal, the polarity of the periphery is preferentially reversed, and that it is difficult to form a homogeneous ferroelectric spontaneous polarization reversal when width L is wide because the nucleation density is lower compared with when said width is narrow.

Thus, the non patent documents 1 to 6 propose a method for applying low electric field pulses into a substrate to generate nucleuses that are to be the nucleus of a ferroelectric spontaneous polarization reversal, and subsequently applying a high electric field pulse to extend domain wall from said nucleus to thereby realize a ferroelectric spontaneous polarization reversal.

Moreover, it has been reported that a homogeneous ferroelectric spontaneous polarization reversal region can be obtained by this method.

[Non Patent Document 1]

Sunao KURIMURA et al., "Selective nucleation control for a periodically poled lithium niobate I~motivation and background~", Pre-Texts of the 49th Meeting; The Japan Society of Applied Physics and Related Societies, March 2002
[Non Patent Document 2]
Takeshi AKUTSU et al., "Selective nucleation control for a periodically poled lithium niobate II
~Periodical poling by selective nucleation control~", Pre-Texts of the 49th Meeting; The Japan Society of Applied Physics and Related Societies, March 2002
[Non Patent Document 3]
Masayuki MARUYAMA et al., "Selective nucleation control for a periodically poled lithium niobate III~Qualification of nucleation density by particle analysis~", Pre-Texts of the 49th Meeting; The Japan Society of Applied Physics and Related Societies, March 2002
[Non Patent Document 4]
Yoshiyuki NOMURA et al., "Selective nucleation control for a periodically poled lithium niobate IV~Pulse number dependence of nucleation density~", Pre-Texts of the 63rd Meeting; The Japan Society of Applied Physics, September 2002
[Non Patent Document 5]
Masayuki MARUYAMA et al., "Selective nucleation control for a periodically poled lithium niobate V~Nucleation parameters for short period structure~", Pre-Texts of the 63rd Meeting; The Japan Society of Applied Physics, September 2002
[Non Patent Document 6]
Masayuki MARUYAMA et al., "Selective nucleation control for a periodically poled lithium niobate VI~green light SHG with high-aspect-ratio periodicdomains~", Pre-Texts of the 50th Meeting; The Japan Society of Applied Physics and Related Societies, March 2003

Also, for an optical element such as an optical modulator, optical element having ridge structure has been put to practical use for the purposes of lowering drive voltage, matching impedance, and expanding bandwidth.

FIG. 7(a) is a perspective view of the optical element having ridge structure and FIG. 7(b) is a cross-sectional view of the substrate along the chain line A in FIG. 7(a). Modulating electrodes or the like are not shown in these figures.

An optical waveguide 112 is formed on a ferroelectric substrate 101 while a ridge 110 is formed on the region including said optical waveguide 112 in FIG. 7. Further, they show a ferroelectric spontaneous polarization reversal region 111 formed on one portion of an optical waveguide 112.

A method for forming a ferroelectric spontaneous polarization reversal in one portion of the ferroelectric substrate and subsequently removing a region where a ridge structure is not formed on the top face of said substrate selectively by mechanical cut or chemical etching as shown in FIG. 8 is a common method for forming a ferroelectric spontaneous polarization reversal in a region having convexo-concave structure such as a ridge structure on the top face of the ferroelectric substrate and including one portion of said convex part as shown in FIG. 7.

Regarding the specific procedures, at first, an electrode 120 having a desired pattern is formed on the top face of a ferroelectric substrate 101 and an electrode 121 is formed on all over the bottom face of said substrate as shown in FIG. 8(a). Then, a high voltage is applied between said electrodes 120 and 121 by a voltage source 122 to form a ferroelectric spontaneous polarization reversal 111 in the region corresponding to the pattern of electrode 120.

After that, electrodes 120 and 121 on the substrate are removed while a mask is formed corresponding to the pattern of a ridge structure formed on the top face of substrate 101. The substrate top face except the mask-covered region is removed chemically by dry etching or wet etching, or mechanically by sandblast or cutting to thereby form ridge structures 123 (see FIG. 8(b)). The concavity and convexity on the substrate surface where an optical waveguide is not formed as shown in the cross-sectional view of FIG. 7(b) are not shown in FIG. 8 to FIG. 14 to facilitate understanding of the description of the present invention.

However, it is difficult to form a desired ridge structure in the chemical removal process because the etching velocity and/or etching direction priority between the ferroelectric spontaneous polarization reversal region and the other region is different, and also, there is a disadvantage that in a mechanical removal process the substrate gets easy to break because the substrate receives much of a shock entirely.

Thus, it is required to form the ridge structure on a ferroelectric substrate firstly, and then, to form a ferroelectric spontaneous polarization reversal in a desired region of said substrate.

FIG. 9 show the method for forming a ferroelectric spontaneous polarization reversal after forming a ridge structure.

At first, optical waveguides 130 are formed on the top face of substrate 101 (see FIG. 9(a)), then, mask members 131 are formed on the region for forming a ridge structure on the top face of the substrate 101. After that, the region where mask members 131 are not formed is removed by etching or the like to thereby form ridge structures 132.

In order to form a ferroelectric spontaneous polarization in ferroelectric substrate 101 which has formed ridge structures 132, at first an electrode 133 is formed on the desired region of the top face of the substrate 101, and at the same time, an electrode 134 is formed all over the bottom face of the substrate 101. Then, a high voltage 135 is applied between both electrodes 133 and 134 to form a ferroelectric spontaneous polarization reversal 136 in the region of the substrate corresponding to the pattern of electrode 133 as shown in FIG. 9(d).

After forming a ferroelectric spontaneous polarization reversal, electrodes 133 and 134 are removed to obtain the substrate having the ridge structures where the polarity of one portion is reversed as shown in FIG. 9(e).

However, the ferroelectric spontaneous polarization reversal method in FIG. 9 has some negative effects such as the substrate becomes easy to break because the electric filed becomes concentrated at the edges 137 of electrode 133 formed on the ridge structure in FIG. 9(d), and further, when forming a ferroelectric spontaneous polarization reversal over the ridge structure and other regions, voltage adjustment in a ferroelectric spontaneous polarization reversal becomes complicated because the ridge and other regions are different in thickness and therefore, are different in strength of the electric field.

On the other hand, the method for using the insulating mask as shown in FIGS. 10 and 11 is cited as a method for forming a ferroelectric spontaneous polarization reversal in a ferroelectric substrate 101 which formed the ridge structure in FIG. 9(c).

In FIG. 10, an insulating mask 140 is formed on the top face of substrate 101 where a ferroelectric spontaneous polarization reversal is not formed. Said substrate is put between electrodes 142 and 143 with sealing members 141 while conductive liquids 145 and 146 are filled between a substrate 101 and each electrode 142 and 143, and a high voltage 144 is applied through the electrodes 142 and 143 like FIG. 2.

This method enables the forming of ferroelectric spontaneous polarization reversal 147 in the region of the substrate where the insulating mask 140 is not formed. The insulating mask is removed away after the ferroelectric spontaneous polarization reversal.

Also, in FIG. 11, an insulating mask 150 is formed on the bottom face of substrate 1 where a ferroelectric spontaneous polarization reversal is not formed. Said substrate is put between electrodes 152 and 153 with sealing members 151 while conductive liquids 155 and 156 are filled between a substrate 101 and each electrode 152 and 153, and a high voltage 154 is applied through the electrodes 152 and 153 like FIG. 2 or FIG. 10.

After that, a ferroelectric spontaneous polarization reversal 157 in the region of the substrate where the insulating mask 150 is not formed is formed, and subsequently the insulating mask 150 is removed.

However, the method for forming a ferroelectric spontaneous polarization reversal using the insulating mask as shown in FIGS. 10 and 11 has a problem that the material for the insulating mask is limited because it is necessary to select the material having electric resistance higher than that of the ferroelectric substrate 101.

Furthermore, although when a resist mask that is widely used as the insulating mask is used here, hard baking treatment is effective in increasing the electric resistance value of a resist mask, it becomes difficult to remove the resist mask after forming a ferroelectric spontaneous polarization reversal. Moreover, the control accuracy of a ferroelectric spontaneous polarization reversal region declines because unintended micro ferroelectric spontaneous polarization reversal regions (micro-domain) are introduced into the substrate entirely due to the heat treatment, and operation troubles or a degradation of characteristics of a device using a ferroelectric spontaneous polarization reversal structure, such as a wavelength conversion element or an optical modulator, could be caused.

In addition, when an electric resistance value of an insulating mask cannot be raised adequately, a ferroelectric spontaneous polarization reversal region sometimes spreads to an unintended region of the substrate as shown by 148 of FIG. 10 or 158 of FIG. 11. It becomes difficult to control the formation of the ferroelectric spontaneous polarization reversal region accurately.

Further, the method for forming a ferroelectric spontaneous polarization reversal by the electrode pattern as shown in FIG. 1 or the insulating mask pattern as shown in FIG. 2 has problems that the fineness and the closeness of a ferroelectric spontaneous polarization reversal region are limited depending on the formation accuracy of a stroke width and/or a spacing of each pattern, and that the production process including to form a ferroelectric spontaneous polarization reversal becomes complicated because extra processes for forming patterns and removing the patterns have to be needed in the production process.

The first object of the present invention is to solve the problems described above and to provide a method for forming a ferroelectric spontaneous polarization reversal homogeneously even if the width of a ferroelectric spontaneous polarization reversal region is over 50 μm, and further, to provide a method for forming a ferroelectric spontaneous polarization reversal that enable the lowering of the intensity of an applied voltage in a ferroelectric spontaneous polarization reversal.

The second object of the present invention is to provide a method for forming a ferroelectric spontaneous polarization reversal where the ferroelectric substrate has convexo-concave structure, such as ridge structure and the like, on its surface and the polarity of the region including one portion of said convex part is reversed with accuracy.

Moreover, the third object of the present invention is to provide a method for forming a ferroelectric spontaneous polarization reversal which could form a polarization reversal region closely, accurately and finely on a ferroelectric substrate, and also to provide the method for forming a ferroelectric spontaneous polarization reversal that is capable of preventing a production process from being complicated.

SUMMARY OF THE INVENTION

In order to solve the problems described above, a first aspect of the invention provides the method for forming a ferroelectric spontaneous polarization reversal in a desired region of a ferroelectric substrate, which has a feature that said desired region of a surface of said ferroelectric substrate is sprayed with micro-hard materials, made an impact by using a striking member that has micro tip diameter, or rubbed with micro-hard materials that are dispersively located on the surface of the substrate, and subsequently, a given voltage is applied into said desired region to thereby form a ferroelectric spontaneous polarization reversal in said desired region of said ferroelectric substrate.

A second aspect of the invention provides the method for forming a ferroelectric spontaneous polarization reversal in a desired region of a ferroelectric substrate, wherein, for said desired region of a surface of the ferroelectric substrate, an electrode pattern or a mask pattern is composed of aggregates of micropatterns, and subsequently a given voltage is applied into said desired region.

A third aspect of the invention provides the method for forming a ferroelectric spontaneous polarization reversal in a desired region of a ferroelectric substrate, where the thickness of substrate in said desired region of said ferroelectric substrate is thinner than the region except said desired region of the substrate, and a given voltage is applied into said desired region to thereby form a ferroelectric spontaneous polarization reversal in said desired region of said ferroelectric substrate.

A fourth aspect of the invention provides the method for forming a ferroelectric spontaneous polarization reversal according to the third aspect, which has a feature that a surface of the ferroelectric substrate is etched in order to make said ferroelectric substrate thinly.

A fifth aspect of the invention provides the method for forming a ferroelectric spontaneous polarization reversal according to any of the third and fourth aspects, which has a feature that the face for forming said ferroelectric substrate thinly is different from the face for forming a waveguide on said ferroelectric substrate.

A sixth aspect of the invention provides the method for forming a ferroelectric spontaneous polarization reversal, where a convexo-concave structure is formed on the top face of a ferroelectric substrate firstly, and then, a ferroelectric spontaneous polarization region is formed on the substrate including one portion of said convex part, which has a feature that a concave portion is formed on the bottom face of the substrate within the region where a ferroelectric spontaneous polarization reversal is to be formed and at least said convex portion is formed, and then, an electric field is applied into said substrate.

A seventh aspect of the invention provides the method for forming a ferroelectric spontaneous polarization reversal according to the sixth aspect, having a feature that the depth of said concave portion on the bottom face of the substrate is greater than the height of the convex portion on the top face of the substrate.

An eighth aspect of the invention provides the method for forming a ferroelectric spontaneous polarization reversal according to any of the sixth and seventh aspects, which has a feature that the width of said concave portion on the bottom face of the substrate is wider than the width of said convex portion on the top face of the substrate.

A ninth aspect of the invention provides the method for forming a ferroelectric spontaneous polarization reversal according to any of the sixth through eighth aspects, which has a feature that said electric field is applied via liquid electrode.

A tenth aspect of the invention provides the method for forming a ferroelectric spontaneous polarization reversal according to any of the sixth through ninth aspects, which has a feature that at least one portion of the region except said concave portion on the bottom face of the substrate is removed after forming a ferroelectric spontaneous polarization reversal.

An eleventh aspect of the invention provides the method for forming a ferroelectric spontaneous polarization reversal according to any of the sixth through ninth aspects, which has a feature that said concave portion on the bottom face of the substrate is filled entirely or partially with a material that has almost equal dielectric constant or coefficient of thermal expansion of said substrate after forming a ferroelectric spontaneous polarization reversal.

A twelfth aspect of the invention provides the method for forming a ferroelectric spontaneous polarization reversal where a concave portion is formed on the top face of a ferroelectric substrate or the bottom face of a ferroelectric substrate, an electric field is applied into the substrate, and a ferroelectric spontaneous polarization reversal is formed at least in one portion of a region of said substrate with said concave portion, which has a feature that the shape of said concave portion is configured such that the width of said concave portion gets narrower gradually toward the inside of the substrate.

A thirteenth aspect of the invention provides the method for forming a ferroelectric spontaneous polarization reversal according to the twelfth aspect, which has a feature that after first forming of a ferroelectric spontaneous polarization reversal, the top face of the substrate or the bottom face of the substrate that has already formed said concave portion is made almost a flat-plane, and then, a new concave portion is formed in a region where it was not formed previously, and after that an electric field is applied into said substrate to form a ferroelectric spontaneous polarization reversal again at least in one portion of the region of the substrate with said concave portion.

A fourteenth aspect of the invention provides the method for forming a ferroelectric spontaneous polarization reversal according to the twelfth aspect, which has a feature that the concave portions formed on the top and bottom faces of said substrate are placed in different geometric locations where the following ferroelectric spontaneous polarization reversal regions corresponding to said concave portions could not overlap.

A fifteenth aspect of the invention provides the method for a ferroelectric spontaneous forming polarization reversal according to any of the twelfth through fourteenth aspects, which has a feature that said applied electric field is gradually increased from a weak electric field including 0 to the given value of the electric field.

A sixteenth aspect of the invention provides the method for forming a ferroelectric spontaneous polarization reversal according to the twelfth through fifteenth aspects, which has a feature that said electric field is applied via liquid electrode.

In accordance with the first aspect of the invention, nucleuses are generated on the substrate surface by adding mechanical stress to the substrate surface using the methods for spraying the desired region of the ferroelectric substrate surface with the micro-hard materials, making an impact by the striking member that has micro tip diameter, or rubbing with the micro-hard materials that are dispersively located on the substrate surface, or the like.

Subsequently, centering on the nucleuses, a ferroelectric spontaneous polarization reversal is formed by applying the given voltage to said desired region.

This makes it possible to generate nucleuses within the region where it is desired to form a ferroelectric spontaneous polarization reversal as well as its periphery and to improve nuclear growth density. It is possible to achieve a homogeneous ferroelectric spontaneous polarization reversal even when a large dimension of a ferroelectric spontaneous polarization reversal region is formed.

Furthermore, for a $LiNbO_3$ crystal or a $LiTaO_3$ crystal, nucleuses on the substrate surface can be generated by a minute stress or impact, and therefore, a ferroelectric spontaneous polarization reversal region can be formed easily without using a large-scale equipment. Moreover, since it is very little nucleuses that are formed on the substrate surface and the mechanical load on the substrate is small as a whole, the mechanical property of the substrate itself does not deteriorate as a result.

In accordance with the second aspect of the invention, the use of micropatterns can generate nucleuses around each pattern, and, considering the whole polarization reversal region, it is possible to generate many nucleuses within the region. Even when a large dimension of a ferroelectric spontaneous polarization reversal region is formed, homogeneous polarization reversal can be realized.

In accordance with the third aspect of the invention, to make the thickness of the region of the substrate that is forming a ferroelectric spontaneous polarization reversal thinly enables to reduce applied voltage for forming a ferroelectric spontaneous polarization reversal. This method is effective to avoid troubles such as dielectric breakdown and this could also reduce the cost for mass production by degreasing requirements for the special fixture and/or power supply equipment.

In accordance with the fourth aspect of the invention, in the thinning process of said ferroelectric substrate thickness, there is no mechanical load on the substrate as a whole because etching is applied to the surface of said ferroelectric substrate and therefore the mechanical property of the substrate itself does not deteriorate as a result. Also, when a waveguide element is formed, it is desirable to remove the step that is formed after a ferroelectric spontaneous polarization reversal by polishing or the like because said step could cause an optical loss.

In accordance with the fifth aspect of the invention, it could provide an optical waveguide device that has no degradation of optical characteristics such as an optical loss because there is no affect of changing the substrate thickness because although one region of one face of the substrate corresponding to the shape of the ferroelectric spontaneous polarization reversal region is thinned by cut or etching, the optical waveguide is formed on the other face of the substrate. In this case, the process stated above of removing the step by polishing can be omitted.

In accordance with the sixth aspect of the invention, it becomes possible to increase the strength of an electric field in forming a ferroelectric spontaneous polarization reversal because a concave portion is formed on the bottom face of the ferroelectric substrate in a region where the convex portion is formed and the substrate in the region with the convex portion is thinned.

Thus, it becomes possible to form a polarization reversal accurately in said region of the substrate including said convex part.

In accordance with the seventh aspect of the invention, by making the depth of the concave portion formed on the bottom face of the substrate greater than the height of the convex portion formed on the top face of the substrate, the strength of an electric field applied to the region of the convex part on the substrate top face in forming polarization reversal can be equalized with or be made stronger than the strength of other regions where said concave portion is not formed on the bottom face of the substrate. Thus, it becomes possible to form polarization reversal accurately in said region of the substrate including said convex part.

In accordance with the eighth aspect of the invention, by making the width of the concave portion formed on the bottom face of the substrate wider than the width of the convex portion formed on the top face of the substrate, it becomes possible to form a ferroelectric spontaneous polarization reversal where said region of the substrate including the convex portion certainly. Moreover, it is possible to control a ferroelectric spontaneous polarization reversal region more clearly because the bottom edges of the convex portion and the bottom of the concave portion are located proximally, and as a result, a ferroelectric spontaneous polarization reversal is formed in the early stage of forming a ferroelectric spontaneous polarization reversal in this proximal section, and after that, a ferroelectric spontaneous polarization reversal makes progress in the region of the convex part.

In accordance with the ninth aspect of the invention, it is possible to apply an electric field all over the ferroelectric substrate corresponding to the thickness of the substrate, irrespective of convexo-concave structure on the top face or the shape of the convex portion on the bottom face of the substrate because a ferroelectric spontaneous polarization reversal is performed by the liquid electrode using conductive liquid. Thus, the ferroelectric spontaneous polarization reversal region can be controlled accurately by setting the shape of the top and bottom faces of the substrate with accuracy.

In accordance with the tenth aspect of the invention, by removing at least one portion of the region except said concave portion on the bottom face of the substrate after forming a ferroelectric spontaneous polarization reversal, it is possible to compensate a stress distribution over the ferroelectric substrate caused by a temperature change or a propagation characteristics change of a microwave or the like in case of using the ferroelectric substrate as an optical device.

In accordance with the eleventh aspect of the invention, by filling the whole or a portion of the concave portion on the bottom face of the substrate with the material having almost equal dielectric constant or coefficient of thermal expansion of said substrate after forming a ferroelectric spontaneous polarization reversal, it is possible to compensate the electrical characteristic of the substrate or the stress distribution related to the thermal expansion by adjusting the dielectric constant or a spatial distribution of coefficient of thermal expansion of the substrate.

In accordance with the twelfth aspect of the invention, since the shape of the concave portion is configured such that the width of said concave portion gets narrower gradually toward the inside of the substrate, the thickness of the substrate varies according to location within the concave portion. It is configured such that the thickness of the substrate gets thicker gradually from the deepest part of the concave portion toward the entry of the concave portion. Due to this configuration, it becomes possible to arbitrarily form a ferroelectric spontaneous polarization reversal region in accordance with the strength of an electric field applied into the substrate, centering on the deepest part of the concave portion and also within the width of the entry of the concave portion.

In other words, it becomes possible to form a ferroelectric spontaneous polarization reversal region with its width narrower than the entry shape of the concave portion.

In accordance with the thirteenth aspect of the invention, it could become possible to locate and form several ferroelectric spontaneous polarization reversal regions closely by using the method that firstly forming a ferroelectric spontaneous polarization reversal using the concave portion of the substrate, then, new concave portion is formed again on the region except said concave portion had formed previously.

In accordance with the fourteenth aspect of the invention, it could become possible to locate and form several ferroelectric spontaneous polarization reversal regions closely because the polarization reversal region formed by the concave portion on the top face of the substrate and the polarization reversal region formed by the concave portion on the bottom face of the substrate are located at different places within the substrate.

In accordance with the fifteenth aspect of the invention, it is possible to arbitrarily adjust a ferroelectric spontaneous polarization reversal region in accordance with the given strength of an electric field applied into the substrate, centering on the deepest part of the concave portion and also within the width of the entry of the concave portion, in such a manner that the electric field applied into the substrate is controlled to be gradually increased from the weak electric field including 0 to a given strength of an electric field in forming a ferroelectric spontaneous polarization reversal.

In accordance with the sixteenth aspect of the invention, it is possible to apply an electric field into the substrate effectively even when the concave portion is formed on the top face or bottom face of the substrate because the electric field is applied via the liquid electrode.

BRIEF DESCRIPTION OF THE DRAWINGS

FIG. 14 are diagrams showing the treatment after a ferroelectric spontaneous polarization reversal for the ferroelectric substrate having the concave portion on the bottom face of the substrate; (a) is a diagram in which the region except the concave portion is removed and (b) is a diagram in which the whole or a portion of said concave portion is filled in;

EXPLANATIONS OF NUMERALS

Figure 1:
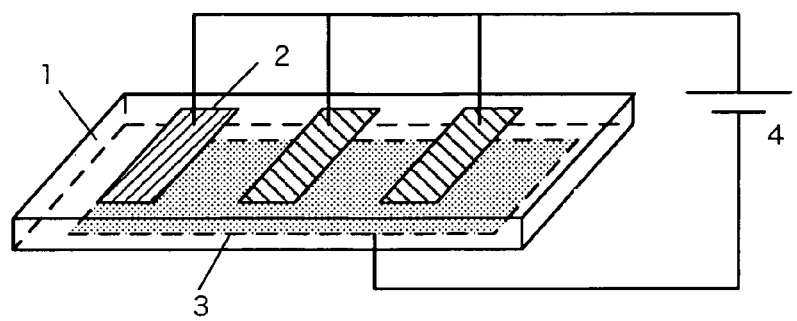
FIG. 1 is a diagram showing the method for forming a ferroelectric spontaneous polarization reversal using the electrode pattern according to the prior art.

1, 101, 201 Ferroelectric substrate
2 Patterned electrode
3 Bottom face electrode
4 Applied voltage
5 Insulating mask pattern
6, 7, 162, 163 Electrode
8, 9, 161 Sealing member
10, 167, 211, 221, 224, 232, 233 Ferroelectric spontaneous polarization reversal region
20 Micro-defects or micro-residual stress region
130 Optical waveguide
132 Ridge structure
160, 210, 220, 223, 230, 231 Concave portion
165, 166 Conductive liquid
167 Ferroelectric spontaneous polarization reversal region
170 Removed portion
71 Filled part

DETAILED DESCRIPTION OF THE INVENTION

In the following, the preferred embodiments of the present invention are explained in detail.

Figure 4:
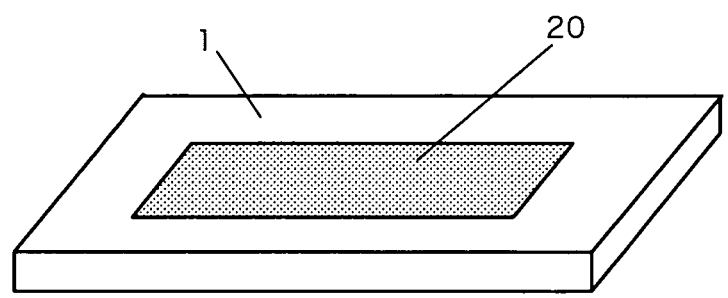
FIG. 4 is a diagram showing the micro-defects or the like formed on the surface of the substrate.

FIG. 4 is a diagram showing many nucleuses generated on the surface of a ferroelectric substrate 1 for a ferroelectric spontaneous polarization reversal region 20.

If such nucleuses exist, a ferroelectric spontaneous polarization reversal is expanded around these nucleuses when an electric field is applied into the ferroelectric substrate. Thus, if these nucleuses exist moderately in a desired ferroelectric spontaneous polarization reversal region, it becomes possible to realize homogeneous ferroelectric spontaneous polarization reversal state across a large diameter ferroelectric wafer, even when a ferroelectric spontaneous polarization reversal is simultaneously performed for several large regions of over 25 μm in a ferroelectric spontaneous polarization reversal region width within a large diameter ferroelectric wafer of over 2 inches in diameter.

A method of applying mechanical shock or the like or a chemical method can be used as the method for generating nucleuses. In particular, when micro-defects or the like are formed by using mechanical power, nucleuses can be generated more effectively by raising the temperature of the substrate.

In the following, specific methods are described.

(1) Micro Sandblast Method

A non-polarization reversal region on the surface of a substrate is coated with a rubber resist film or the like, and then, spraying abrasive material, dry ice or the like, that are micro-hard materials, with said surface of the substrate at high speed, which generates nucleuses by these impact.

(2) Wire Brush Method

Like the micro sandblast method, the surface of a substrate is coated with a rubber resist film or the like, and then, a striking member having micro tip diameter such as a wire brush gives said substrate surface a shock and thereby generates nucleuses.

(3) Application of a Dot Impact Printer

A printer head of a wire dot impact printer selectively gives a shock to the surface of a substrate for a ferroelectric spontaneous polarization reversal region, and thereby generates nucleuses.

(4) Application of a Printing Method

By a screen printing, an inkjet printer or the like, the pattern of a polarization reversal region is printed on the surface of a substrate by using resin ink that comprises hard resin and abrasive material. After drying the print, the printed part is rubbed with a baren or the like through a cushioning such as a cloth or paper to generate nucleuses.

(5) Application of an Abrasive Sheet or the Like

A non-polarization reversal region on the surface of a substrate is coated with a rubber resist film or the like, and then, an abrasive sheet is pressed on or rubbed against the surface of the substrate. Alternatively, after said coating, abrasive material is sprayed over the surface of the substrate and then rubbed against the surface of the substrate as being pressed on it. Further, a patterned abrasive sheet in the shape of a ferroelectric spontaneous polarization reversal region is preliminarily prepared. Said abrasive sheet is attached to the substrate and pressed on the substrate.

Figure 2:
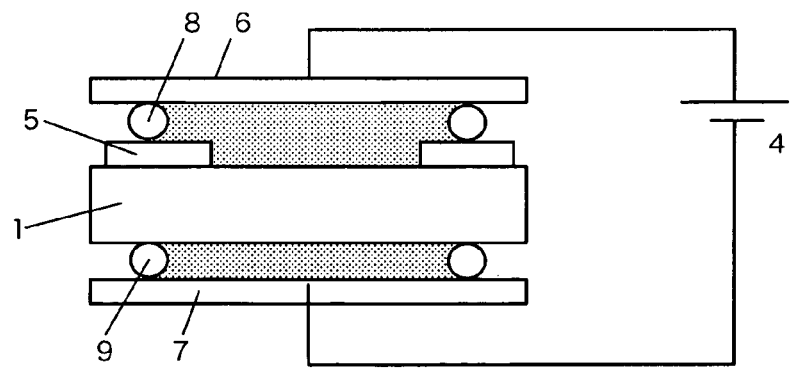
FIG. 2 is a diagram showing the liquid electrode method according to the prior art.
Figure 3:
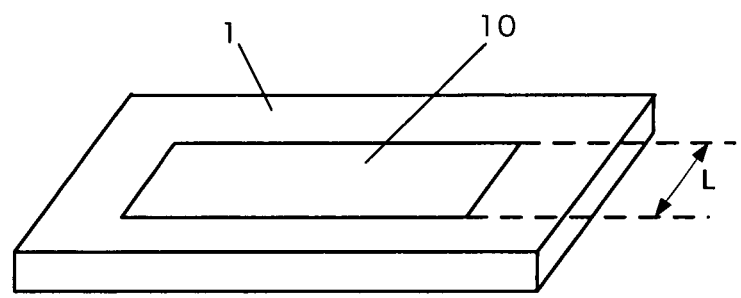
FIG. 3 is a diagram showing the ferroelectric spontaneous polarization reversal region formed on the substrate.

After generating nucleuses as stated above, it is possible to form a ferroelectric spontaneous polarization reversal region on the substrate by applying the method for forming a ferroelectric spontaneous polarization reversal as FIG. 1 or FIG. 2.

In particular, an electrode pattern corresponding to the shape of the ferroelectric spontaneous polarization reversal region is formed on the top face of the substrate and an electrode is uniformly formed on the bottom face of the substrate. By applying a pulse voltage between both electrodes, a ferroelectric spontaneous polarization reversal is expanded around nucleuses. Thus, a homogeneous ferroelectric spontaneous polarization reversal corresponding to said electrode pattern can be formed.

In a method using conductive liquid, after forming an insulating mask pattern on the surface of the substrate, conductive liquid is placed on both faces of said substrate and a pulse voltage is applied into said conductive liquid. This enables a ferroelectric spontaneous polarization reversal to be expanded around nucleuses.

In addition, it is also possible to substitute the above rubber resist film used in generating nucleuses for the above insulating mask pattern.

As another method for forming a large ferroelectric spontaneous polarization reversal region, there is a method of using the electrode pattern of in FIG. 1 or the mask pattern in FIG. 2 of aggregates of micropatterns. In the following, the mask pattern is explained as an example.

Figure 5:
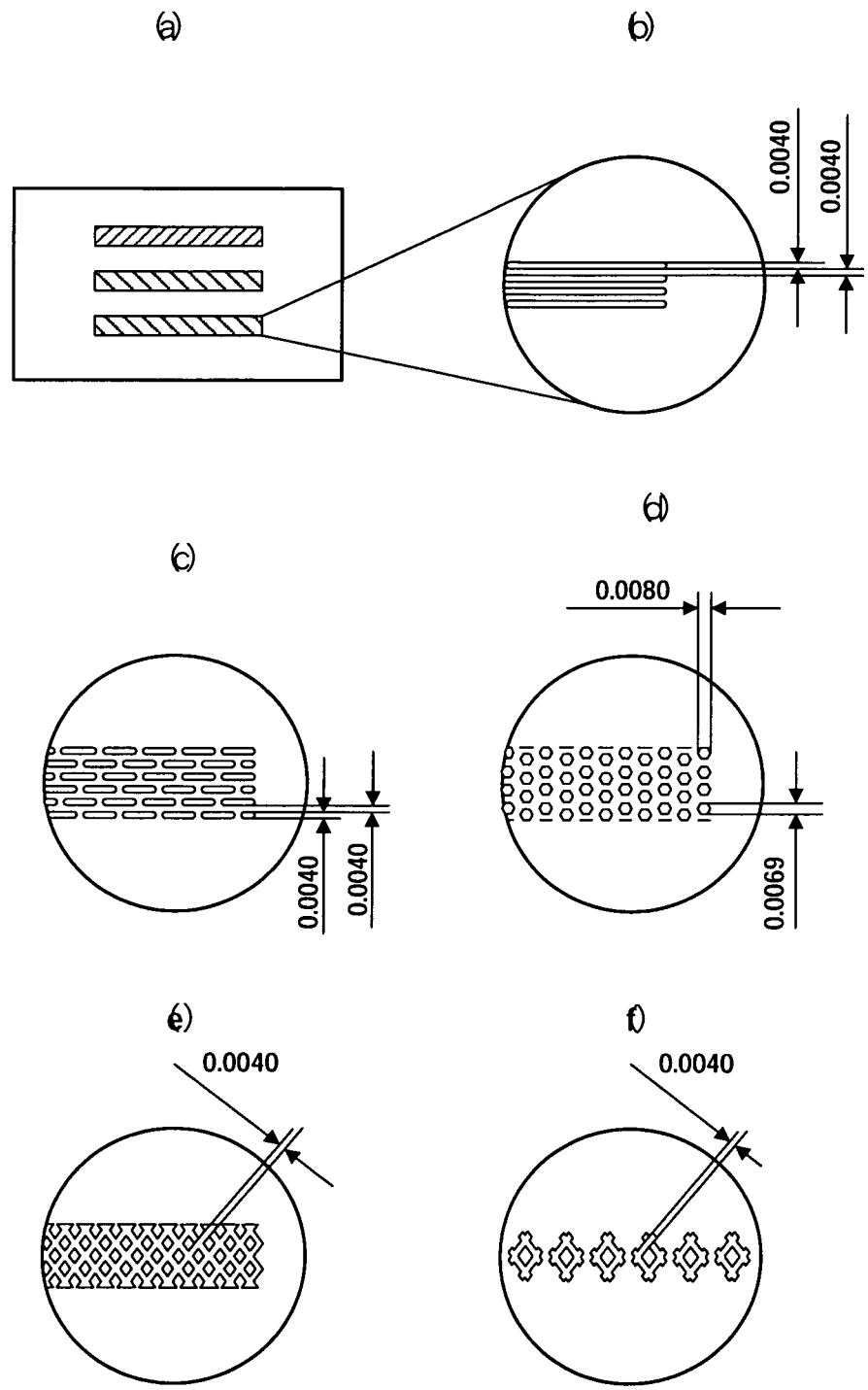
FIG. 5 are diagrams where a mask pattern is composed of aggregates of micropatterns.

Specifically, when a ferroelectric spontaneous polarization reversal region of more than 20 μm in width as shown in FIG. 5(a) is formed, a ferroelectric spontaneous polarization reversal region in a given shape is formed as an aggregate of micro stripe-shaped mask patterns of 4 μm in width (an aperture being formed at a stripe-shaped portion of an insulating mask) as FIG. 5 (b) firstly. Then, by contacting conductive liquid with the ferroelectric substrate through said stripe-shaped aperture as shown in FIG. 2, an electric field is applied into said substrate.

By using these micropatterns, nucleuses could develop on around each pattern, and as a whole a ferroelectric spontaneous polarization reversal region, it becomes possible to generate many nucleuses within the region. Beyond the stroke width in embodiments, nucleuses can be generated stably if the stroke width of each pattern is less than 10 μm.

Also, as the configuration of the micropatterns, various applications such as the ellipse-shaped pattern as in FIG. 5(c), hexagon-shaped pattern as in FIG. 5(d), network pattern as in FIG. 5(e), and further, double cross shaped pattern (or "lozenge-shaped") as in FIG. 5(f) are possible of applying as well as the stripe-shaped pattern as in FIG. 5(b). In addition, the numerals attached to each pattern here indicate width in mm unit.

Further, when straight line is comprised in the micropatterns, it is difficult to cause merging of the ferroelectric spontaneous polarization reversal region in some case of the crystal orientation of the ferroelectric substrate. Thus, it is necessary to take into consideration the angle between straight line and the crystal orientation.

It is also possible to generate a ferroelectric spontaneous polarization reversal around nucleuses by not only using the micropatterns as stated above, but also by firstly performing nucleuses with the micropatterns and subsequently applying an electric field through a normal electrode pattern or mask pattern as well as reversing polarity of the whole region for forming a ferroelectric spontaneous polarization.

In addition, another method for forming a ferroelectric spontaneous polarization reversal is explained.

In particular, to make the substrate thickness thinly in a region of a ferroelectric spontaneous polarization reversal being desired enables to make the electric field of the desired region higher than that of a non-desired region. As a result, without using a mask or the like, a ferroelectric spontaneous polarization reversal can be performed only in said desired region.

Especially by treating the substrate of a ferroelectric spontaneous polarization reversal region with thinning processing, reduction of the applied voltage can be achieved. It is preferred to thin the substrate from its bottom face corresponding to the pattern of the ferroelectric spontaneous polarization reversal region and apply a voltage using conductive liquid.

Figure 6:
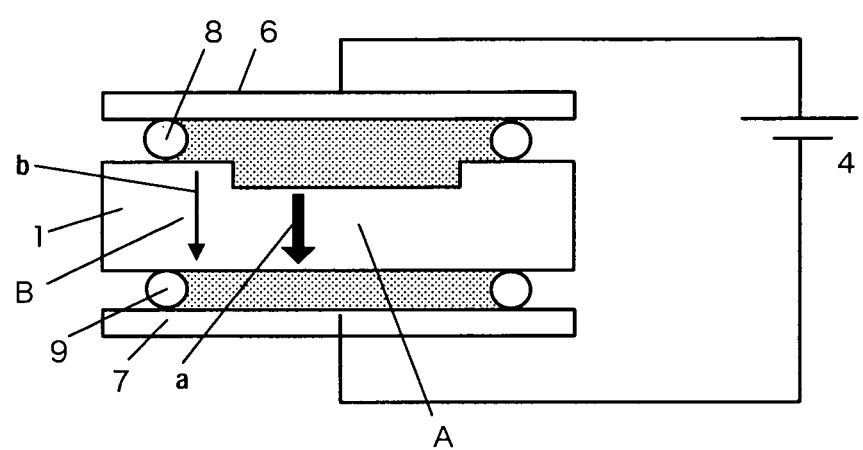
FIG. 6 is a diagram showing a ferroelectric spontaneous polarization reversal being performed for the thinned substrate by the liquid electrode method.
Figure 7:
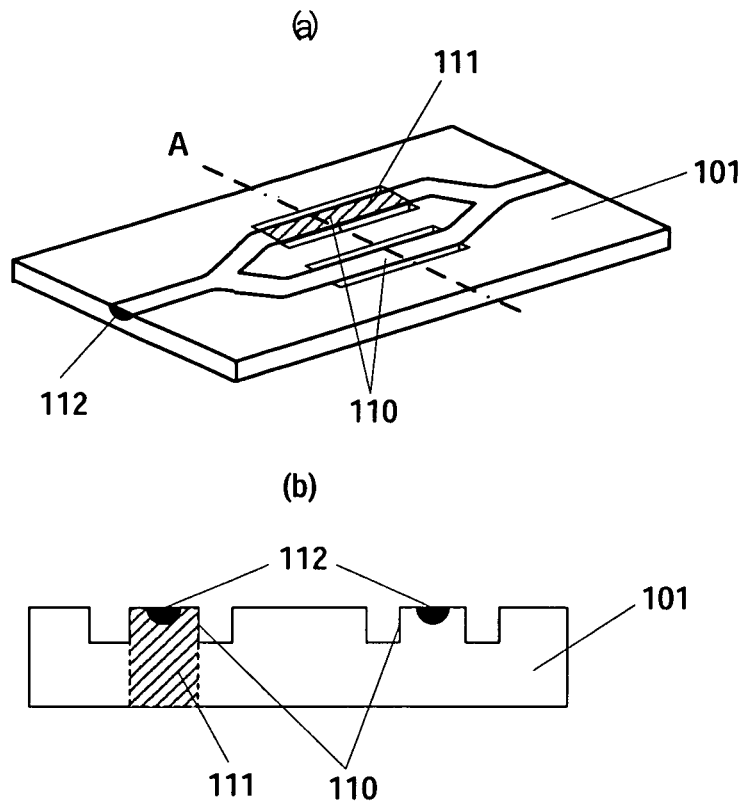
FIG. 7 are diagrams showing the ferroelectric substrate having ridge structures; (a) is a perspective view of said substrate and (b) is a cross-sectional view of said substrate.
Figure 8:
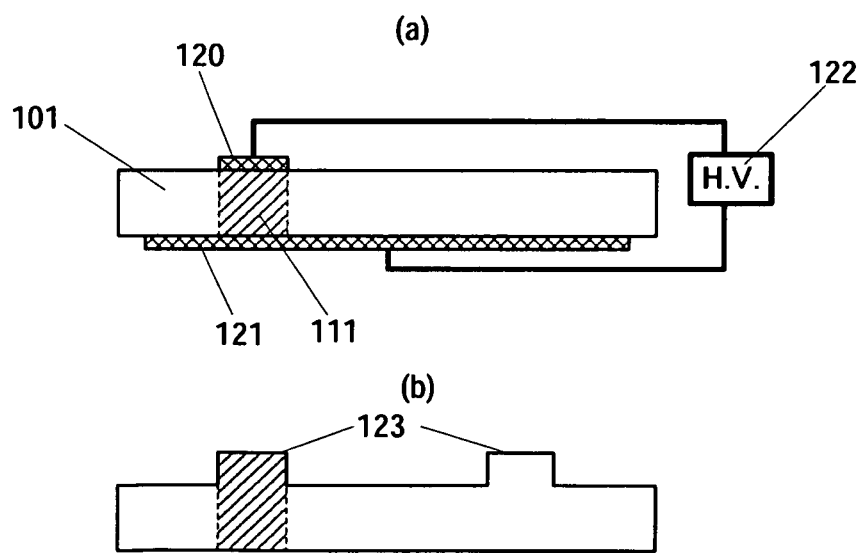
FIG. 8 are diagrams showing the example in which ridge structures are formed after a ferroelectric spontaneous polarization reversal according to the prior art.
Figure 9:
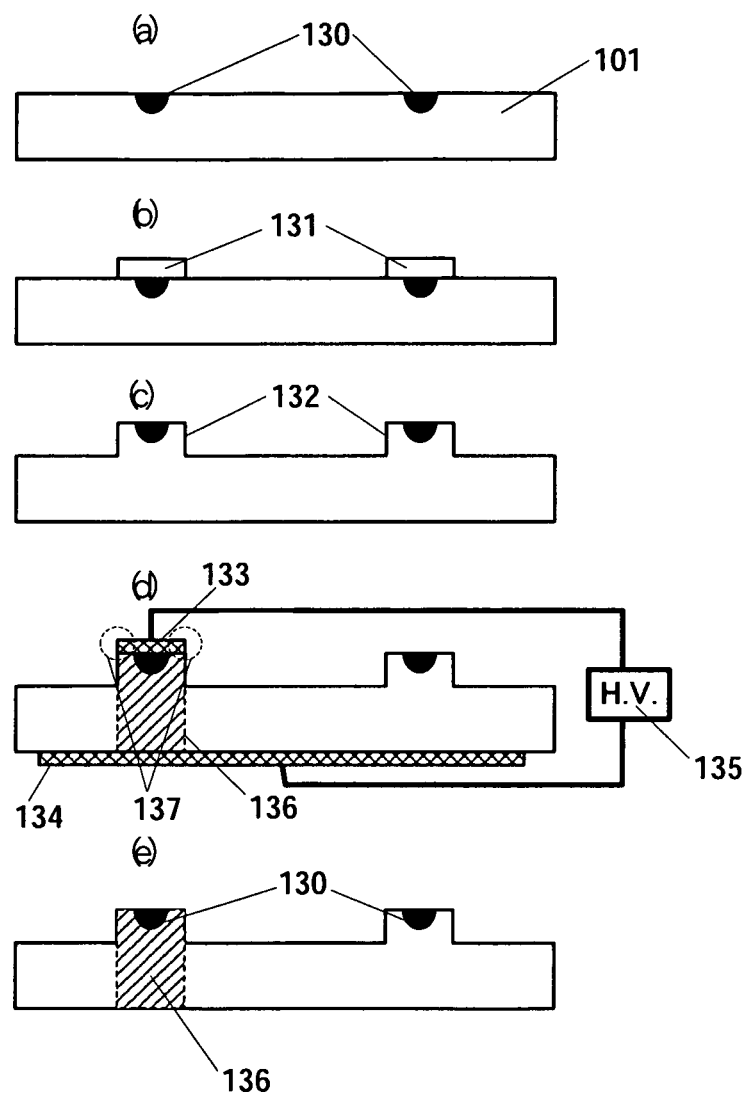
FIG. 9 are diagrams showing examples in which polarization reversal is performed after forming ridge structures according to the prior art.

As the method for thinning, a non-a ferroelectric spontaneous polarization reversal region of the substrate bottom face is covered with a rubber resist film or the like, and then, micro-hard materials, its sand scale being around #600, is sprayed and the substrate is dug from submicron to about 25 μm in depth. Subsequently, applying a voltage into the substrate by the liquid electrode method as in FIG. 6 forms a ferroelectric spontaneous polarization reversal region.

In this case, although the same value of voltage is applied into the thinned part A, where a ferroelectric spontaneous polarization reversal being desired, and the non-thinned part B, where a ferroelectric spontaneous polarization reversal not being desired, the effective electric field "a" of A part is stronger than the electric field "b" of B part. Thus, when said voltage and the thickness of thinned part A are adjusted such that A part has the electric field enough to enhance a ferroelectric spontaneous polarization reversal and B part has the electric field not enough to enhance a ferroelectric spontaneous polarization reversal, it is possible to form a ferroelectric spontaneous polarization reversal in only said desired part.

Also in this case, a ferroelectric spontaneous polarization reversal cannot be generated in B part even if an electric field is applied for a long time. Therefore, the desired ferroelectric spontaneous polarization reversal region can be obtained without using accurate time control of the applied electric field by monitoring a poling current or the like. Further, the electric filed value necessary for forming a ferroelectric spontaneous polarization reversal become lower than the value when thinning is not performed.

Hydrofluoric acid chemical etching or dry etching such as ECR, ISM, and NLD can be applied as another method for thinning the substrate.

At the hydrofluoric acid chemical etching, for example, it is performed after coating, with polyimide resist et al., the bottom face of the substrate in the region where a ferroelectric spontaneous polarization reversal is not desired. The depth of etching is from submicron to about several μm. Subsequently, a voltage is applied into the substrate by the liquid electrode method.

As a method for applying a voltage, a voltage is applied in the same way of that the substrate is thinned by the micro hard materials described above. However, it is also possible to form a ferroelectric spontaneous polarization reversal region by applying a higher voltage than the normal ferroelectric spontaneous polarization reversal all over the substrate firstly before thinning the substrate, and then, reversing a polarity of the whole substrate once, and subsequently performing said thinning treatment and applying the antipolarity voltage. It becomes possible to form a more homogeneous a ferroelectric spontaneous polarization reversal region in this case.

The method for forming a ferroelectric spontaneous polarization reversal of the present invention can be also applied to forming an optical waveguide on the ferroelectric substrate and thereby preparing an waveguide element such as an optical modulator or the like.

When using the above thinning of the substrate to form a ferroelectric spontaneous polarization reversal region, and further to form a waveguide on said thinned substrate, it is desirable to remove a step, which is made by the thinning process on the surface of the substrate, by polishing or the like because it cause an optical loss.

Also, when one face of the ferroelectric substrate corresponding to a ferroelectric spontaneous polarization reversal region is thinned by cut, erosion and the like and the optical waveguide is formed on the other face of the substrate, it becomes possible to provide a waveguide element without any degradation of characteristics such as an optical loss because the variation of the substrate thickness never influences the optical waveguide at all. In this case, it is possible to produce a waveguide element even if a formation of a ferroelectric spontaneous polarization reversal region and a formation of the optical waveguide become reverse in order.

The present invention is not limited to the above description, but it is possible to combine various methods, such as using both nucleuses and thinning of a substrate for the micro sandblast method.

It is also possible to combine a method of irradiating a substrate with ultraviolet ray at the time of applying a voltage and a method of doping a impurity preliminarily on a region corresponding to the a ferroelectric spontaneous polarization reversal region of a substrate as the method for lowering the applied voltage for forming a ferroelectric spontaneous polarization reversal, according to need.

Subsequently, as the second object of the present invention, a method for forming a ferroelectric spontaneous polarization reversal wherein a ferroelectric, substrate has convexo-concave structure, such as ridge structure and the like, on its surface and a polarity of a region including one portion of said convex part is reversed with accuracy is explained.

This invention has a feature that it could provide the method for forming a ferroelectric spontaneous polarization reversal capable of reversing with accuracy in the region including one portion of a convex part, when convexo-concave structure such as ridge structure is formed preliminarily on the surface of the substrate.

Figure 12:
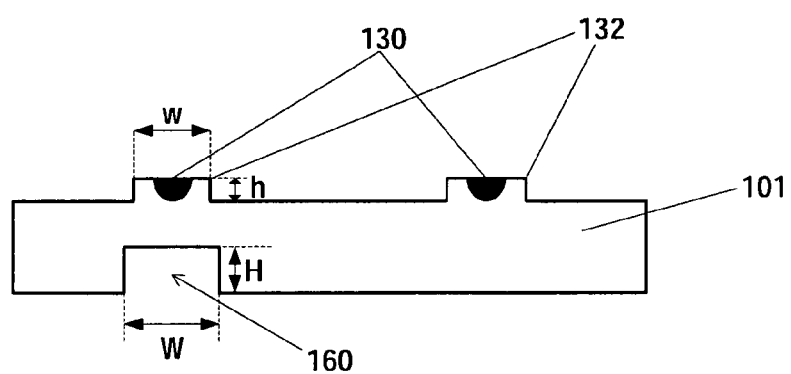
FIG. 12 is a diagram showing the concave portion being formed on the bottom face of the ferroelectric substrate of the present invention.

Specifically, ridge structures 132 are formed on a top face of a ferroelectric substrate 101 as shown in FIG. 12. When ridge structures 132 are included in a region where a ferroelectric spontaneous polarization reversal is to be formed, a concave portion 160 is formed on the bottom face of the substrate where said ridge structure is formed firstly, and then, adjust the strength of an applied electric field in forming a ferroelectric spontaneous polarization reversal. Here, 130 indicates optical waveguides 130 formed on the ridge structures.

The shape of the concave portion is set to $H \geq h$, preferably $H > h$ by comparing depth H of the concave portion with height h of the ridge and to $W \geq w$ by comparing width W of the concave portion with width w of the ridge.

This makes it possible to configure the region of the convex part on a substrate to have the same thickness with or to be thinner than the other region of a substrate even when the convex portion such as the ridge structure is formed on the region of the substrate where a ferroelectric spontaneous polarization reversal is to be formed. Thus, it becomes possible to control the ferroelectric spontaneous polarization reversal region with accuracy because the strength of an electric field at said region of the convex part is the same with or stronger than the other region when a voltage is applied in forming a ferroelectric spontaneous polarization reversal.

It is more preferable to set width W of the concave portion 1.0 to 1.5 times as wide as width w of the ridge structure.

In case of W<1.0 w, it becomes difficult to form a ferroelectric spontaneous polarization reversal region across the width of the ridge structure.

On the other hand, in case of W>1.0 w, the substrate at the foot of the ridge structure w is thinner than the region of the ridge structure and the electric field of forming a ferroelectric spontaneous polarization reversal gets stronger at these feet than at the region of the ridge structure. As a result, a polarity of these feet regions is preferentially reversed. Subsequently, a ferroelectric spontaneous polarization reversal is formed also around the ridge region and it becomes possible to control a ferroelectric spontaneous polarization reversal region more clearly.

However, in case of W>1.5 w, regions thinner than the ridge region are formed around the ridge region. Then, a ferroelectric spontaneous polarization reversal is expanded centering on these peripheries and a ferroelectric spontaneous polarization reversal is formed outside of the ridge region as well as in the ridge region. Thus, it is difficult to control a ferroelectric spontaneous polarization reversal region only within the ridge region accurately. However, this is not the case when a ferroelectric spontaneous polarization reversal is needed to be formed more widely including the peripheral region of the ridge structure due to configuration of an optical modulator for example.

As a method for forming a concave portion on the bottom face of a substrate, micro-hard materials, sand scale being around #600, are sprayed to dig it more than the height h of the ridge structure on the bottom face of the substrate coating the region where it is not desired to form a concave portion with a rubber resist film or the like.

In addition, a hydrofluoric acid chemical etching or a dry etching such as ECR and ICP can be applied. For example, at the hydrofluoric acid chemical etching, the region where it is not desired to form a ferroelectric spontaneous polarization reversal region on the bottom face of a substrate is coated with polyimide resist and the hydrofluoric acid etching is performed.

Figure 13:
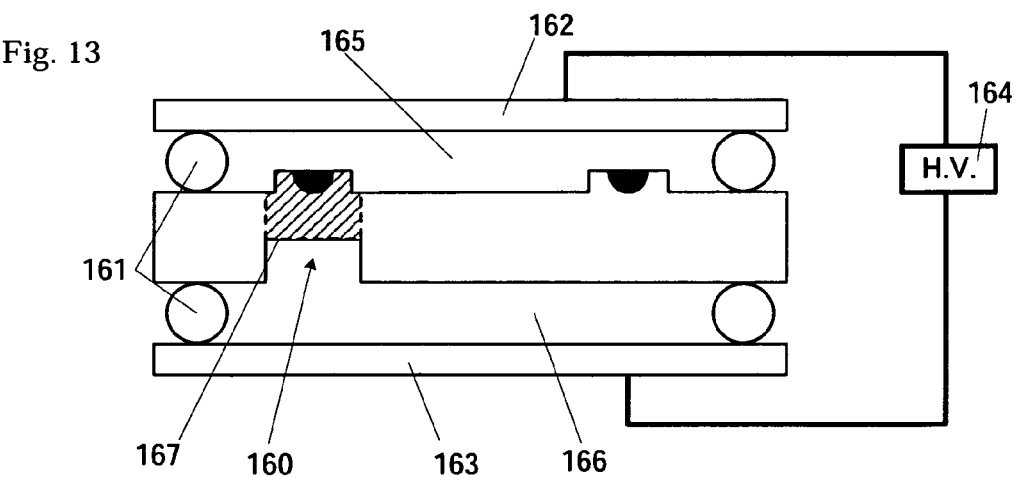
FIG. 13 is a diagram showing the method for forming a ferroelectric spontaneous polarization reversal for the ferroelectric substrate having the concave portion on the bottom face of the substrate according to the present invention.

In order to reverse a polarity of a ferroelectric substrate with a concave portion formed on the bottom face of the substrate as shown in FIG. 12, the substrate in FIG. 12 is put between electrodes 162 and 163 with sealing members 161 while conductive liquids 165 and 166 are filled between said substrate and each electrode 162 and 163, and then, a high voltage 164 is applied into electrodes 162 and 163 as shown in FIG. 13.

As stated above, a conventional insulating mask is not necessary in reversing a polarity of a ferroelectric substrate and it is possible to skip a complicated process such as a formation and removing of the conventional insulating mask. Thus, the production process can be simplified. Further, a hard baking process for improving specific resistance in using resist as the insulating mask is not necessary, and therefore, microdomain is not generated.

Figure 10:
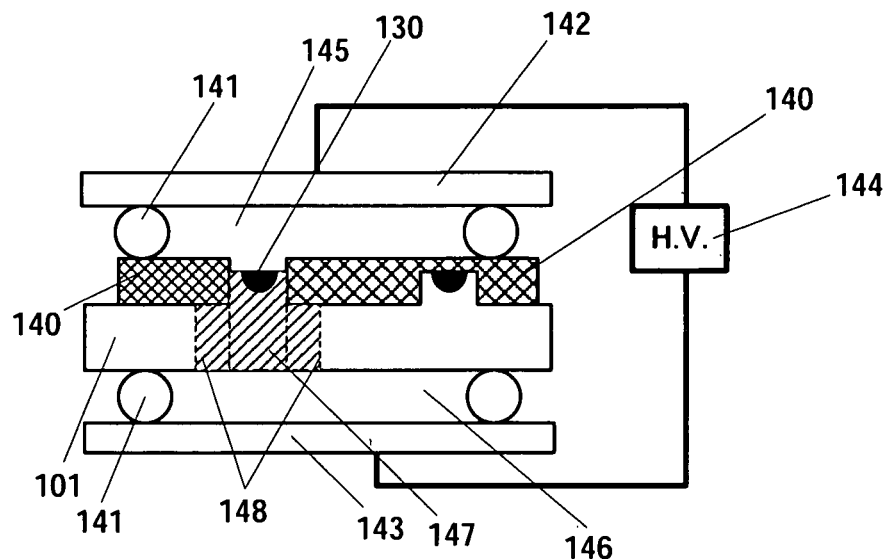
FIG. 10 is a diagram showing the example in which the insulating mask is formed on the surface of the ferroelectric substrate according to the prior art and a ferroelectric spontaneous polarization reversal is performed.
Figure 11:
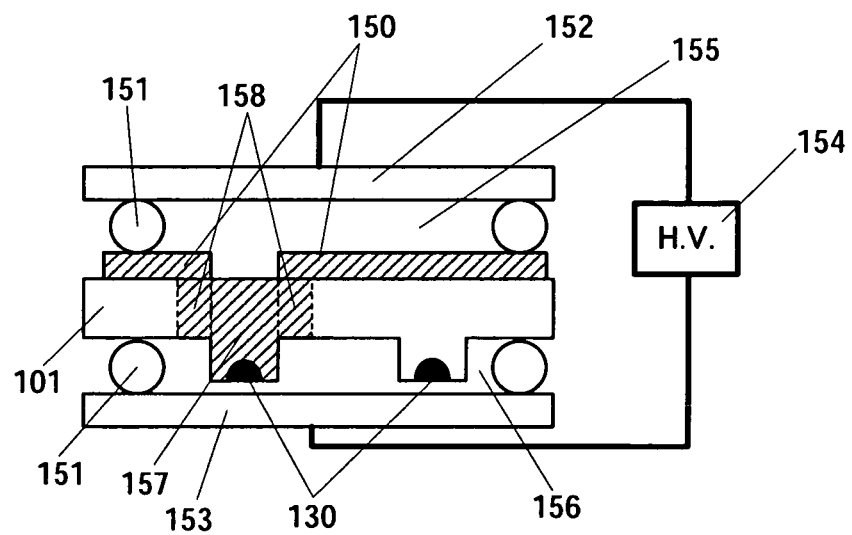
FIG. 11 is a diagram showing the example in which the insulating mask is formed on the bottom face of the ferroelectric substrate according to the prior art and a ferroelectric spontaneous polarization reversal is performed.

In addition, the present invention is not limited to the example that does not use the insulating mask as shown in FIG. 13, but it is possible to use the insulating mask as in FIGS. 10 and 11 to the ferroelectric substrate in FIG. 12 if necessary.

In this case, because a concave portion is formed on the bottom face of the substrate and the strength of an electric field on the ridge region of the substrate can be increased, various materials can be applied as the insulating mask while thermal process for improving the specific resistance of the insulating mask is not required. Thus, it is very convenient to use the present invention.

Next, handling of the ferroelectric substrate after forming a ferroelectric spontaneous polarization reversal is explained.

It is possible to apply the ferroelectric substrate to various uses with a concave portion being formed on the bottom face of the substrate. However, in the case of changing the substrate temperature, for example, a deterioration of a mechanical property or an electrooptic property of the ferroelectric substrate could be caused because the distribution of thermal stress that is caused by the partly formed concave portion on the substrate gets inhomogeneous. Also, when an electric field is applied into the ferroelectric substrate by a microwave that is frequently used for an optical element such as an optical modulator, it is concerned that the propagation characteristic of the microwave changes due to said concave portion.

Figure 14:
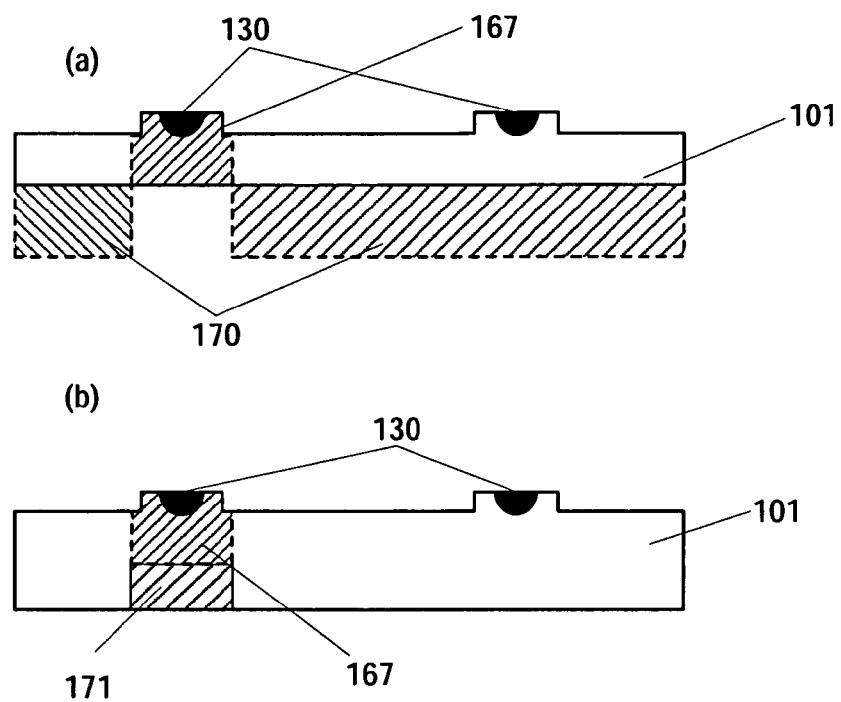

In order to solve the problem due to the concave portion on the bottom face of the substrate, at least one portion of the bottom face of the substrate except the region where the concave portion is formed is removed to thereby relax the influence of the concave portion on the bottom face of the substrate as shown in FIG. 14(a).

In addition, it is also possible to relax the influence of the concave portion on the bottom face of the substrate by filling the concave portion on the bottom face of the substrate entirely or partially with a material that has almost equal dielectric constant or coefficient of thermal expansion of said substrate as shown in FIG. 14(b).

The present invention is not limited to the above description, but rather, it is obviously possible to apply a well known technology in the art if necessary.

Subsequently, as the third object of the present invention, a method for forming a ferroelectric spontaneous polarization reversal capable of forming a ferroelectric spontaneous polarization reversal region closely and accurately on a ferroelectric substrate, and further, capable of preventing the production process from being complicated is explained.

The present invention is characterized in the method for forming a ferroelectric spontaneous polarization reversal which forms a concave portion on the top face or bottom face of the ferroelectric substrate and applies an electric field into said substrate to thereby reverse a polarity of at least one portion of the substrate where said concave portion is formed, wherein the shape of said concave portion is configured such that the width of said concave portion gets narrower gradually toward the inside of the substrate.

Specifically, a concave portion 210 is formed on the bottom face of the a substrate 201 and said concave portion is configured such that the width of concave portion 210 gets narrower gradually toward the inside of the substrate as shown in FIG. 15(a). FIG. 15(a) is a cross-sectional view of ferroelectric substrate 201.

The ferroelectric substrate 201, which is processed as in FIG. 15(a), is put between electrodes 6 and 7 with sealing members 8 and 9 while conductive liquid is filled between substrate 201 and each electrode 6 and 7, and then, a voltage 4 is applied into electrodes 6 and 7 as shown in FIG. 2.

In this case, it is not necessary to form an insulating mask pattern on the top or bottom face of the substrate 201 as shown in FIG. 2. However, the present invention does not eliminate the possibility of adding the insulating mask pattern according to need.

In applying a voltage into substrate 201, the deepest part of a concave portion 210 has the strongest electric field since it is the thinnest in the substrate, and the electric field gets weaker and weaker toward the entry of the concave portion.

Thus, it becomes possible to arbitrarily form a ferroelectric spontaneous polarization reversal region centering on the deepest part of the concave portion and also within the width of the entry of the concave portion by setting an appropriate applied voltage value.

Specifically, a ferroelectric spontaneous polarization reversal region 211 is formed around the deepest part of the concave portion when an electric field is weak (when an applied voltage is low), and a ferroelectric spontaneous polarization reversal can be formed across a peripheral region 212 centering on said deepest part of the concave portion when an electric field gets stronger (when an applied voltage is high) as shown in FIG. 15(b).

Therefore, by applying a weak electric field including 0 into the substrate and increasing the strength of the electric field gradually till a given strength of an electric field in forming a ferroelectric spontaneous polarization reversal, it becomes possible to arbitrarily adjust a ferroelectric spontaneous polarization reversal region centering on the deepest part of the concave portion and also within the width of the entry of the concave portion in accordance with the given strength of the electric field applied into the substrate.

Processing by sandblast or mechanical cut using a grinder can form a concave portion on a substrate 201. It is also possible to form it by chemical treatment such as dry etching. At sandblast or dry etching, the region where a concave portion is not formed is coated with a resist film and after that processed.

In applying an electric field into a substrate 201, it is necessary to fully exclude bubble at the concave portion of substrate 201 preliminarily. It is preferable to perform an adequate degassing process by applying an ultrasonic wave into the substrate or conductive liquid if necessary.

Next, a method for forming a fine and close ferroelectric spontaneous polarization reversal region is explained.

Figure 16:
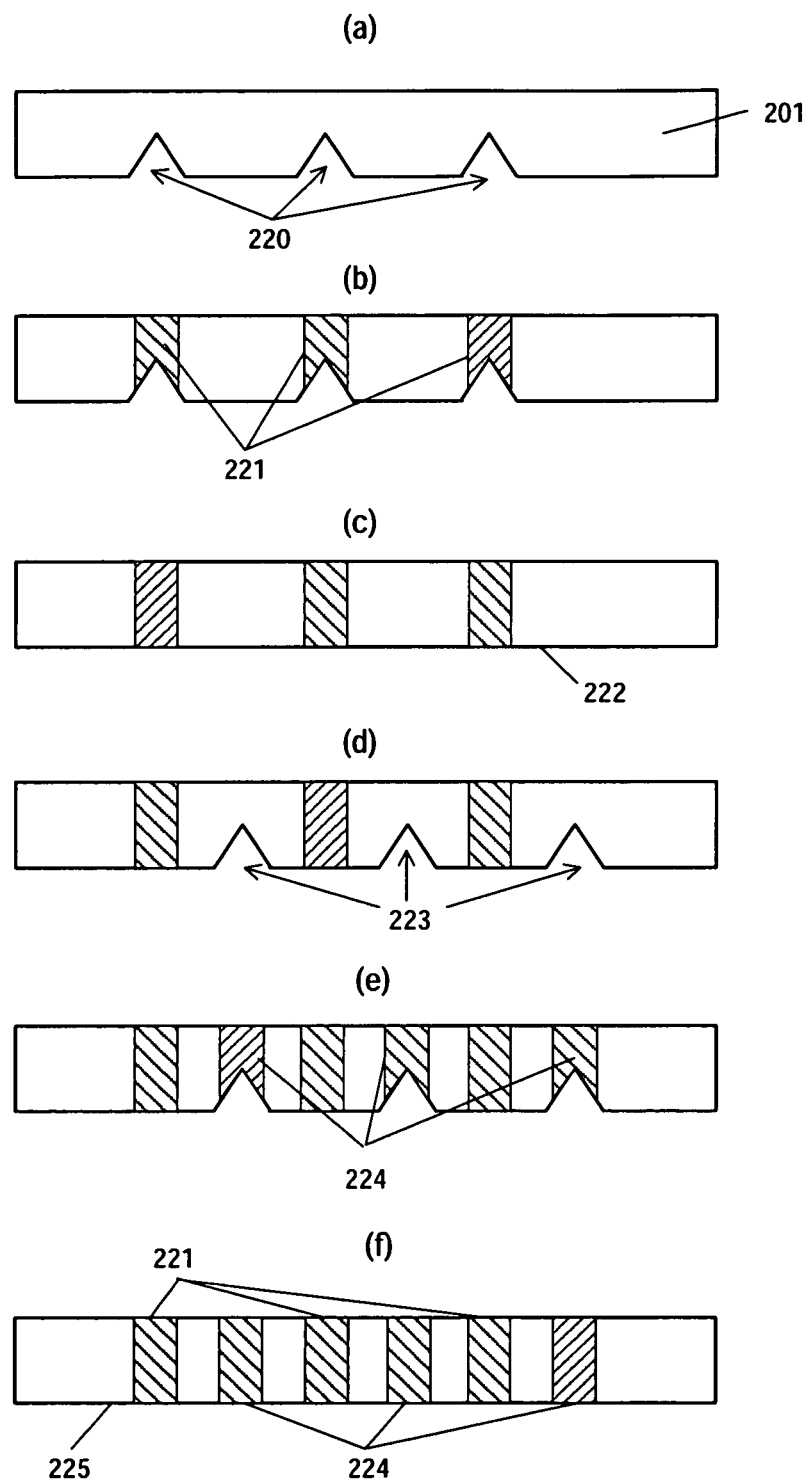
FIG. 16 are diagrams showing the method for forming a fine and close ferroelectric spontaneous polarization reversal regions by the method for forming a ferroelectric spontaneous polarization reversal according to the present invention.

FIG. 16 are diagrams showing the process for forming a ferroelectric spontaneous polarization reversal region.

Concave portions 220 are formed on the bottom face of a ferroelectric substrate 201 as shown in FIG. 16(a). Subsequently, the substrate 201 is put between electrodes 6 and 7 with sealing members 8 and 9 while conductive liquid is filled between substrate 201 and each electrode 6 and 7, and then, a voltage 4 is applied into electrodes 6 and 7 as shown in FIG. 2. Thus, ferroelectric spontaneous polarization reversal regions 221 are formed in each region including the deepest part of each concave portion as shown in FIG. 16(b).

The bottom face of the substrate in FIG. 16(b) where ferroelectric spontaneous polarization reversal regions are formed is cut and polished to remove the concave portions. FIG. 16(c) shows the bottom face of the substrate 222 with said concave portions being removed.

As a method for removing the concave portions, filling said concave portion with a material that has almost equal electrical resistivity of the substrate 201 could be a substitute method of the cut and polishing.

Next, the concave portions 223 are formed again on the bottom face of the substrate as shown in FIG. 16(d), and then, an electric field is applied to form new ferroelectric spontaneous polarization reversal regions 224 as shown in FIG. 16(e).

Finally, the bottom face of the substrate is cut and polished to remove the concave portions 223. FIG. 16(f) shows the bottom face of the substrate 225 with said concave portions being removed.

With the above production processes, first ferroelectric spontaneous polarization reversal regions 221 and second ferroelectric spontaneous polarization reversal regions 224 are formed together on the substrate 201. Thus, it is possible to form fine and close ferroelectric spontaneous polarization reversal regions.

In addition, it is also possible to form second concave portions on or after on the top face of substrate 201.

Next, another method for forming a fine and close a ferroelectric spontaneous polarization reversal region is explained.

Concave portions 230 and 231 are formed on the top face and bottom face of the ferroelectric substrate 201 as shown in FIG. 17(a).

The substrate 201, where said concave portions are formed, is put between electrodes 6 and 7 with sealing members 8 and 9 while conductive liquid is filled between substrate 201 and each electrode 6 and 7, and then, a voltage 4 is applied into electrodes 6 and 7 as shown in FIG. 2. Thus, it becomes possible to form several ferroelectric spontaneous polarization reversal regions 232 and 233 in the region including the deepest part of each concave portion as shown in FIG. 17(b).

After that, by cutting and polishing the top face and bottom face of the substrate 201, the substrate where several ferroelectric spontaneous polarization reversal regions are located closely as shown in FIG. 17(c) can be obtained. The concave portions used in forming a ferroelectric spontaneous polarization reversal are removed from the top face 234 and bottom face 235 of the substrate.

Figure 15:
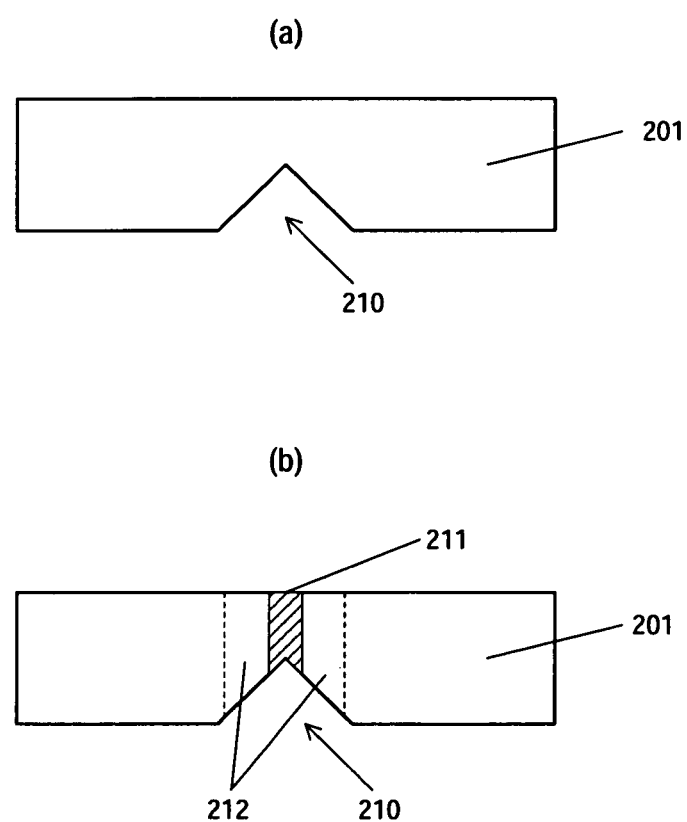
FIG. 15 are diagrams showing the example of the method for forming a ferroelectric spontaneous polarization reversal according to the present invention; (a) is a cross-sectional view of the structure of the substrate before a ferroelectric spontaneous polarization reversal and (b) is a diagram showing the condition after a ferroelectric spontaneous polarization reversal.
Figure 17:
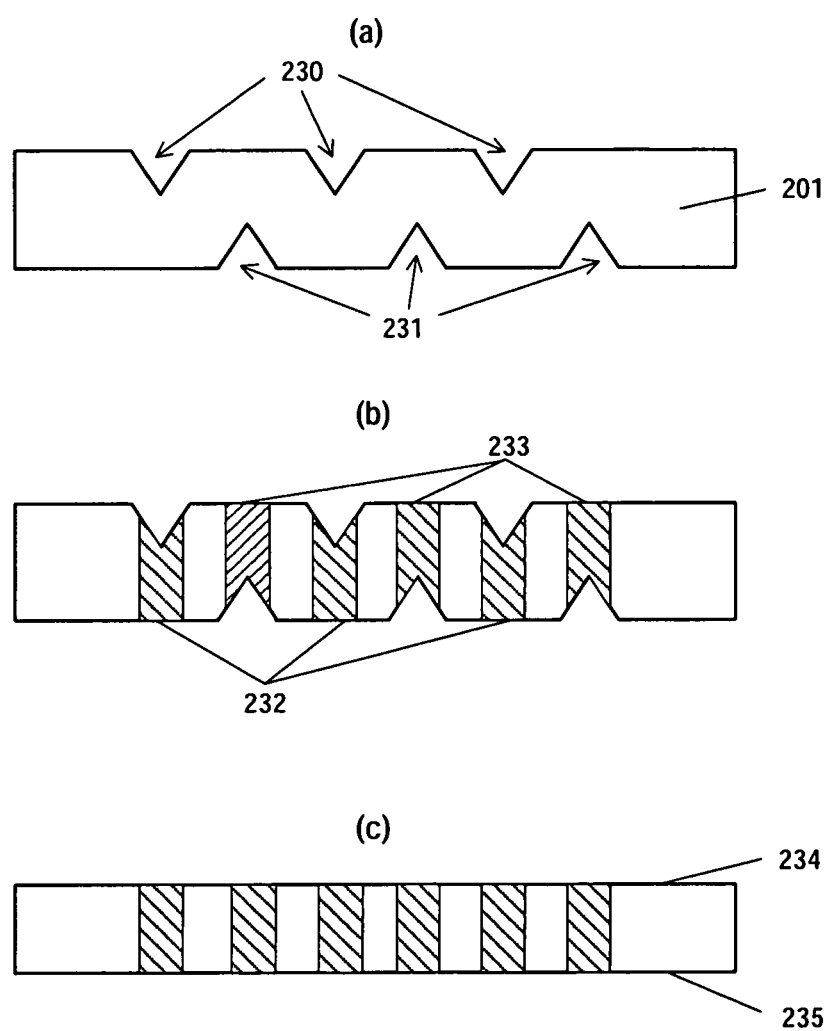
FIG. 17 are diagrams showing another method for forming a fine and close ferroelectric spontaneous polarization reversal region by the method for forming polarization reversal according to the present invention.

The shape of the concave portions according to the present invention is not limited to the triangle shape at cross section as shown in FIGS. 15 to 17, but can use various shapes at cross section such as an ellipse as long as the width of said concave portions gets narrower toward the inside of the substrate.

The present invention is not limited to the above description, but rather, it is obviously possible to apply a well known technology in the art if necessary.

As described above, in accordance with the present invention, it is possible to form a ferroelectric spontaneous polarization reversal condition homogeneously within the ferroelectric spontaneous polarization reversal region even across a large region of 50 μm and over in width of a ferroelectric spontaneous polarization reversal being formed. Further, the present invention can provide a method for forming a ferroelectric spontaneous polarization reversal capable of lowering intensity of the applied voltage in a ferroelectric spontaneous polarization reversal.

In addition, in accordance with the present invention, it becomes possible to provide a method for forming a ferroelectric spontaneous polarization reversal where the ferroelectric substrate has convexo-concave structure such as ridge structure and the like on its surface and a polarity of the region of the substrate including one portion of said convex part is reversed with accuracy.

Moreover, in accordance with the present invention, it becomes possible to provide a method for forming a ferroelectric spontaneous polarization reversal capable of forming the fine and close ferroelectric spontaneous polarization reversal region on the ferroelectric substrate, and further, capable of preventing a production process from being complicated.

Also, since the method for forming a ferroelectric spontaneous polarization reversal according to the present invention forms a ferroelectric spontaneous polarization reversal using the concave portion, it can be used for all types of substrate, and an insulating mask or the like is not necessary. Thus, it has a great deal of potential in industry.

The invention claimed is:

1. A method for forming a ferroelectric spontaneous polarization reversal, comprising the steps of:
   forming a concave portion on a top face of a ferroelectric substrate or a bottom face of a ferroelectric substrate, and
   applying an electric field into the substrate, wherein
   a ferroelectric spontaneous polarization reversal is formed at least in one portion of a region of said substrate with said concave portion, and wherein
   a shape of said concave portion is configured such that a width of said concave portion gets narrower gradually toward an inside of the substrate, and
   after said ferroelectric spontaneous polarization reversal has been formed, making into almost a flat-plane the top face of the substrate or the bottom face of the substrate in which said concave portion had been formed,
   and then, forming a new concave portion in a region where no concave portion was formed previously,
   and then applying an electric field into said substrate to form a ferroelectric spontaneous polarization reversal again at least in one portion of the region of the substrate having said new concave portion.

2. A method for forming a ferroelectric spontaneous polarization reversal, comprising the steps of:
   forming concave portions on both a top face of a ferroelectric substrate and a bottom face of a ferroelectric substrate, and
   applying an electric field into the substrate, wherein
   a ferroelectric spontaneous polarization reversal is formed at least in one portion of a region of said substrate with said concave portion,
   a shape of said concave portion is configured such that a width of said concave portion gets narrower gradually toward an inside of the substrate, and
   wherein concave portions are placed in different geometric locations where following ferroelectric spontaneous polarization reversal regions corresponding to said concave portions do not overlap respectively.

3. The method for forming a ferroelectric spontaneous polarization reversal according to claim 1, wherein said applied electric field is gradually increased from a weak electric field including 0 to a given value of the electric field.

4. The method for forming a ferroelectric spontaneous polarization reversal according to claim 1, wherein said electric field is applied via liquid electrode.

5. The method for forming a ferroelectric spontaneous polarization reversal according to claim 2, wherein said applied electric field is gradually increased from a weak electric field including 0 to a given value of the electric field.

6. The method for forming a ferroelectric spontaneous polarization reversal according to claim 2, wherein said electric field is applied via liquid electrode.

* * * * *